Jan. 6, 1959 J. L. SHANAHAN 2,867,283
WIND POWER MACHINE
Filed July 17, 1956 3 Sheets-Sheet 1

INVENTOR.
John L. Shanahan
BY Victor J. Evans &co.
ATTORNEYS

Jan. 6, 1959 J. L. SHANAHAN 2,867,283
WIND POWER MACHINE
Filed July 17, 1956 3 Sheets-Sheet 2

INVENTOR.
John L. Shanahan
BY Victor J. Evans &Co.
ATTORNEYS

Jan. 6, 1959   J. L. SHANAHAN   2,867,283
WIND POWER MACHINE
Filed July 17, 1956   3 Sheets-Sheet 3
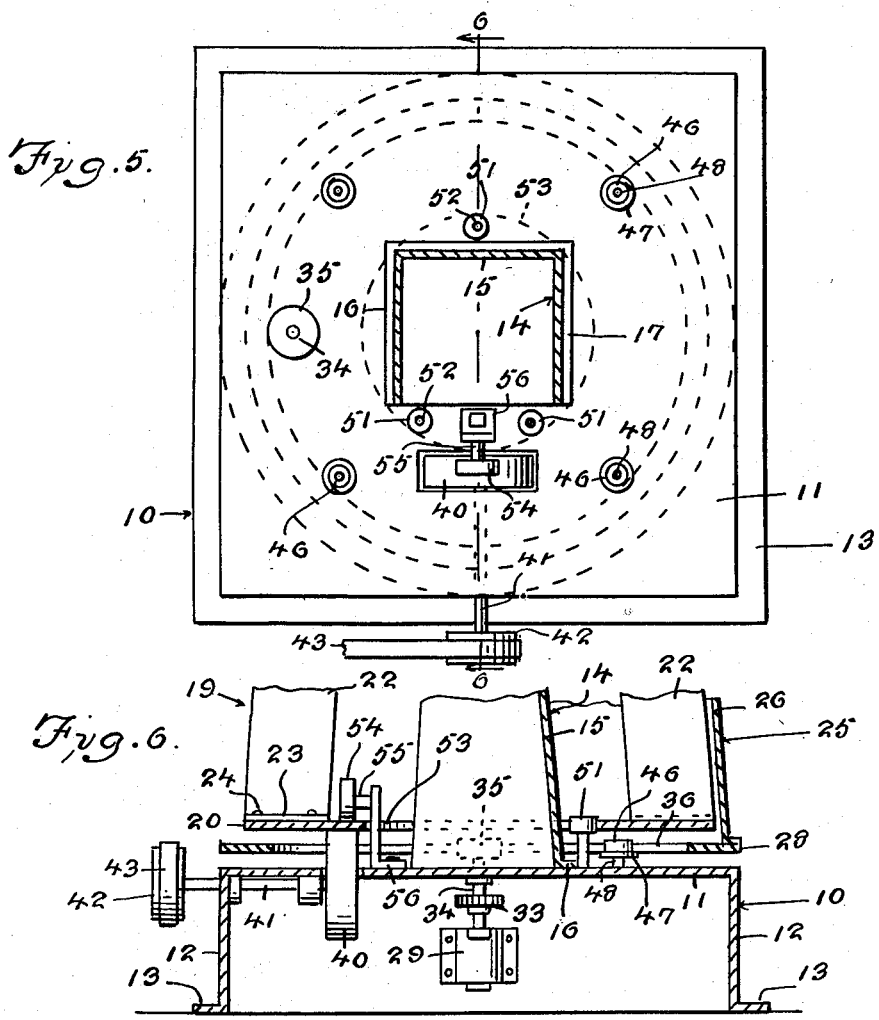
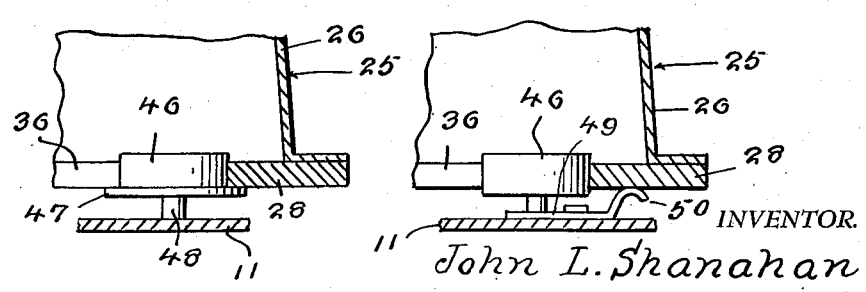
INVENTOR.
John L. Shanahan
BY Victor J. Evans &Co.
ATTORNEYS United States Patent Office 2,867,283
Patented Jan. 6, 1959

2,867,283
WIND POWER MACHINE
John L. Shanahan, St. Louis, Mo.
Application July 17, 1956, Serial No. 598,326
5 Claims. (Cl. 170—15)

This invention relates to a wind power machine or apparatus.

The object of the invention is to provide a machine which is adapted to utilize the energy of wind so as to provide a useable source of power or energy.

Another object of the invention is to provide a wind power machine which includes a tower that is surrounded by a rotary element or rotor, the rotor adapted to deliver power to a shaft or other member whereby this power can be converted to useful energy, there being a shield surrounding a portion of the rotor whereby the speed and rotation of the rotor can be readily controlled.

Another object of the invention is to provide a wind power machine which includes a vertical rotor which surrounds a tower and wherein there is a minimum number of parts so that the apparatus is simple to operate and maintain and use.

A still further object of the invention is to provide a wind power machine which is extremely simple and inexpensive to manufacture.

Other objects and advantages will be apparent during the course of the following description.

In the accompanying drawings, forming a part of this application, and in which like numerals are used to designate like parts throughout the same.

Figure 1 is an elevational view illustrating the wind power machine of the present invention.

Figure 2 is a top plan view of the wind power machine.

Figure 5 is a horizontal sectional view illustrating certain constructional details of the apparatus.

Figure 6 is a sectional view taken on the line 6—6 of Figure 5.

Figure 7 is a view illustrating one of the guide rollers arranged in engagement with a portion of the apparatus.

Figure 8 is a view similar to Figure 7 but showing a modification.

Figure 3:
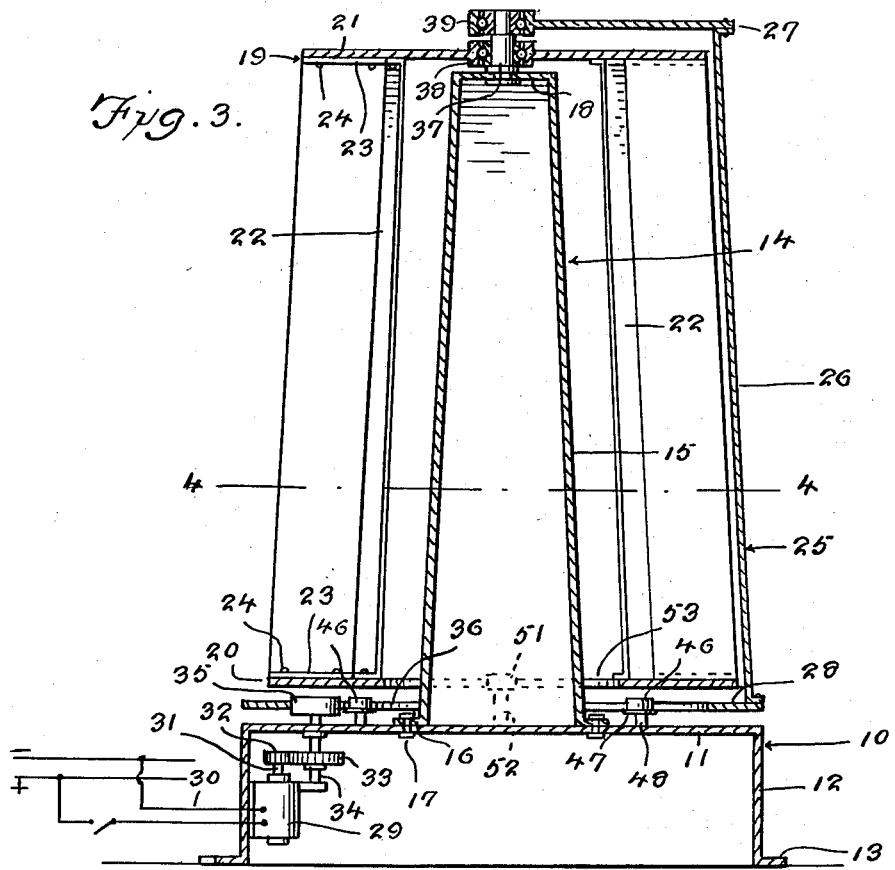
Figure 3 is a longitudinal vertical sectional view taken through the wind power machine.
Figure 4:
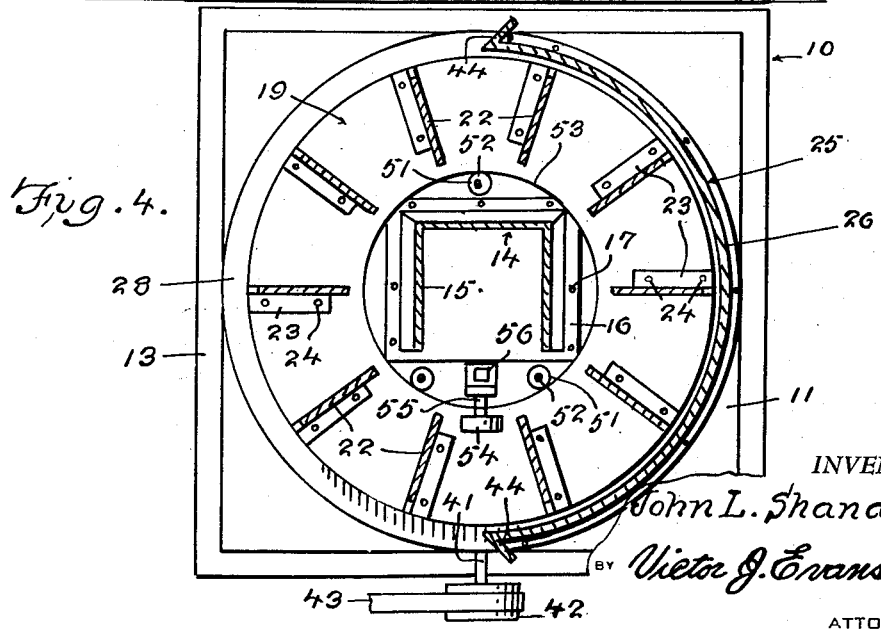
Figure 4 is a sectional view taken on the line 4—4 of Figure 3.

Referring in detail to the drawings, the numeral 10 designates a hollow stationary base which can be made of any suitable material, and the base 10 includes a top wall 11 and vertical side walls 12. The lower edges of the side wall 12 may be provided with horizontal flanges 13, Figure 3.

The numeral 14 designates a stationary tower which extends upwardly from the base 10, and the tower 14 includes wall members 15 which may have flanges 16 on their lower ends secured to the top wall 11 of the base 10 through the medium of suitable securing elements such as bolts 17. The tower 14 further includes a horizontal top wall member 18.

The wind power machine of the present invention further includes a rotor 19 which is mounted for rotary movement about the stationary tower 14, and the rotor 19 includes lower and upper discs or plates 20 and 21. The disc 21 is of smaller diameter than the disc 20.

The tower 14 may have a tapered shape so that the upper portion of the tower 14 is smaller than the lower portion thereof. Extending between the discs 20 and 21 and secured thereto, is a plurality of spaced apart vanes or blades 22 which may be secured in place by means of flanges 23, and the flanges 23 may be secured to the discs 20 and 21 by means of suitable securing elements such as the rivets 24.

There is further provided a movable shield which is indicated generally by the numeral 25, and the shield 25 includes a curved wall member of baffle 26 which has it upper end secured to a horizontal plate 27, while the lower end of the baffle 26 is secured to a horizontal plate 28.

A means is provided for rotating the shield 25 whereby rotation of the rotor 19 can be controlled as desired. This means comprises a reversible motor 29 which is mounted within the base 10, and the motor 29 may be of conventional construction. The electric motor 29 is adapted to be connected to a suitable source of electrical energy by means of wires 30. The motor 29 drives a shaft 31 which has a gear 32 thereon, and the gear 32 meshes with a gear 33 on a shaft 34. A roller or wheel 35 is mounted on the upper end of the shaft 34, and the roller 35 is arranged in frictional engagement with the plate 28 on the lower end of the shield 25. The plate 28 is provided with a central circular opening or cutout 36 through which extends a portion of the roller 35. Thus, by actuating the motor 29, the roller 35 will be rotated and this in turn will cause rotation of the plate 28 whereby the shield 25 will be rotated about an axis extending through the tower 14, so that the shield 25 can be positioned at any desired position whereby rotation of the rotor 19 by the wind can be accurately controlled or regulated.

Extending upwardly from the top wall 18 of the tower 14 is a stud shaft 37, and ball bearing assemblies 38 and 39 are arranged in engagement with the stub shaft 37. The ball bearing assembly 39 may be connected to the top plate 27 of the movable shield 25.

A means is provided for utilizing the energy created by the rotating member or rotor 19, and this means comprises a roller or wheel 40 which is arranged in frictional engagement with the lower surface of the disc 20 at the bottom of the rotor 19. The wheel 40 is mounted on the inner end of the shaft 41, and a pulley 42 may be arranged on the outer end of the shaft 41, the pulley 42 having a suitable belt 43 trained thereover. Thus, power from the belt 43 can be used for any desired purpose.

As shown in Figure 2, portions 44 of the shield 25 may be arranged angularly for a purpose to be later described.

There is further provided guide rollers or wheels 46 which are arranged in engagement with the plate 28 on the bottom of the shield 25. The rollers 46 may be provided with enlarged horizontal flanges 47 which may engage the bottom of the plate 28 so as to help maintain the shield 25 in its proper position. The rollers 46 may be mounted on shafts 48. Instead of using the flanges 47, a modified arrangement may be used as shown in Figure 8 wherein body members 49 may be secured to the base 10, and the body members 49 may be provided with curved fingers or lips 50 which engage the bottom of the movable shield 25.

There is further provided guide rollers or wheels 51 which are mounted on shafts 52 that may extend upwardly from the base 10. The rollers 51 may extend through a cutout 53 which is arranged in the disc 20 on the lower end of the rotor 19.

There is further provided a guide roller 54 which may be mounted on a shaft 55 which is supported by a bracket 56, the roller 54 engaging the upper surface of the disc 20 on the bottom of the rotor 19.

From the foregoing, it is apparent that there has been provided a wind power machine which will effectively utilize the energy of the wind to provide a useful source of energy for any desired purpose. In use with the parts arranged as shown in the drawings, the wind will strike or engage the vanes or blades 22 so as to rotate the rotor 19 about the tower 14. As the rotor 19 turns, it rotates the wheel 40 since the wheel 40 frictionally engages the disc 20 on the bottoms of the rotor 19. As the wheel 40 turns, it rotates the shaft 41 and this in turn causes rotation of the pulley 42 which has the belt 43 trained thereover, and the belt 43 may be used to deliver power or energy to any desired locality. By actuating the reversible motor 29, the gear 32 can be rotated and this will rotate the gear 33 which in turn will rotate the shaft 34 and this rotation of the shaft 34 will turn the roller 35. As the roller 35 turns, it rotates the plate 28 since the roller 35 is arranged in frictional engagement with the plate 28. This movement of the plate 28 will cause movement of the shield 25 so that the shield 25 can be positioned at different locations with respect to the rotor 19. The ball bearing assemblies 39 and 38 provide a rotatable connection between the shield 25 in the top of the tower 14. The wind impinging against the blade 22 causes rotation of the rotor 19. The various guide rollers such as the rollers 46, 51 and 54 serve to insure that the moving parts will be maintained in their proper position as they rotate or move.

The small friction wheel 35 serves to rotate or turn the shield 25. The bearings 39 and 38 serve as combination thrust and radial antifriction bearings. The number of blades 22 can be varied as desired. The inside diameter of the lower rotor plate 20 is smaller than the lower plate 28 of the air-shield in order to clear the air shield and in order to permit the friction wheel to roll against it. The motor 29 controls turning of the air shield 25. The power take-off wheel 40 rolls against the lower surface of the lower rotor plate 20. The air shield 25 can rotate in either direction. The deflector plates 44 serve to catch a little more air and throw the air against the rotor and the deflector plates 44 also helps to stiffen the front edge of the air shield 25. The various guide rollers are arranged so as to maintain the parts in their proper position and these rollers are arranged so that there will be no interference with the moving parts.

The tower 14 rises vertically from the base 10 and instead of using the base 10, other supporting structures can be provided. The parts are made sufficiently strong so as to withstand the stresses developed due to the wind and other weather conditions. The various guide rollers, such as the rollers 51 and 46 may be arranged in concentric circles so as to act as guides for the rotating elements of the wind power machine. The rotor 19 catches the energy in the moving air and transforms it into useful mechanical energy. The rotor is of simple construction and may be cylindrical in shape or as shown in the drawings the rotor has a slightly conical shape or tapered shape so that it will fit more snugly and efficiently over the tapered tower 14. The rotor rotates on a axis perpendicular to the earth and rotates on the same axis as the tower. The rotor includes the two plates 20 and 21, and the lower plate may be of greater diameter than the upper plate. The blades 22 catch the wind and provide a strong complete rotor. The upper plate 21 is centered on the antifriction combination radial and thrust bearing assemblies as shown in Figure 3. The lower plate 20 also serves as a guide to maintain the rotation of the rotor concentric with the tower. This is accomplished by placing antifriction wheels or bearings concentrically around the base of the tower and at such a radius or position that the inside circular edge of the lower plate 20 just rests against them. Then, as the rotor turns, the lower plate 20 turns on the bearings or roller guides. The roller guides permit the roller to turn freely but prevent the rotor from moving out of its concentric path. The lower plate 20 also serves as a means whereby the rotating mechanical motion of the rotor is transmitted to the wheel 40 whereby the mechanical power can be used for any desired purposes such as generating electricity or operating machinery. It will be seen that a simple friction drive is used to take off the power from the revolving lower plate whereby an inexpnsive and simple method is utilized.

The air shield 25 is of sufficient strength and curvature so that it curves around the rotor 19 and is concentric with the rotor. The shield covers at least one quarter of the rotor and may cover more. Thus, the shield wraps around a portion of the rotor and follows the contour of the rotor but is free of the rotor so that either the rotor or shield can rotate independently of each other. The plate 27 is secured to the upper end of the shield 25 and the bearing 39 is connected to the plate 27 so that the shield can rotate around the tower independently of the rotor. The bottom of the shield 25 includes the plate or disc 28 which has the cutout 36. The deflector plates or portions 44 serve to deflect a little more wind to the rotor and increase the over all efficiency, and the air shield is a vital part of the wind power machine of the present invention since it serves to block off one half of the surface of the rotor which is exposed to the wind. Thus, no back pressure is developed on the rotor on the half front which is covered by the shield so that a strong torque is developed on the area struck by the wind and the rotor turns with force. Without the air shield, the wind would press on the rotor blades on both the left and right of the center of rotation so that there would be no worthwhile torque developed. The air shield 25 is also important since as the wind direction shifts, the air shield is turned by means of the motor 29 to conform to the changed wind direction, so that the rotor gains the maximum advantage from the wind. Furthermore, since the air shield exerts a very great effect on the amount of energy which the rotor can pick up from the wind ranging from maximum to zero, it offers a highly effective and primary control over the speed of the rotor under varying wind and load conditions. The air shield 25 is preferably turned at a comparatively slow speed by the motor 29 which operates the friction drive roller 35 which can be used for turning the shield in either direction. The air shield moves only when changing conditions require it to move.

It will be seen that there has been provided a wind power machine which includes a vertical rotor 19 which insures that the rotor will always face the wind. Thus, the problem of moving the massive platform facing to the wind, as is the case or problem with a propeller type of wind power machine, is eliminated. Furthermore, it is not necessary to use the various complicated mechanisms with their weight set high in the air and the present invention has at its top only two plates which turn on the double bearing assembly so that the device is simple to build and maintain. Furthermore, the rotor is a simple integrated unit with no adjustable parts or complicated mechanisms which might get out of order. Since the blades are attached at the top and bottom of the rotor, there is provided a strong structure which differs from a propeller which is supported at only one end of the blade. The lower rotor plate does triple duty since it serves as a structural member which holds all of the blades at their lower ends and also acts as a guide in conjunction with the roller guides to maintain a smooth concentric rotation of the rotor. The lower plate also serves as a power take-off surface.

As previously described, the power is taken off at the bottom of the rotor and the bottom of the machine as a whole so that this eliminates many of the problems which are connected with the usual propeller type machines. With the propeller type machines, it is necessary for an engineer or designer to choose between having the entire generator station set high up on the tower or using a long massive vertical shaft reaching to the ground if the generator was placed there. Either location is bad since in the first instance the great weight placed high in the air is disadvantageous, while in the second instance, the long shaft is difficult to place and keep in alignment and is also expensive.

Furthermore, by using the vertical rotor and air shield with the larger diameter at the bottom rolling against the various roller guides which are firmly anchored in the base of the tower structure, lateral pressure due to wind pressure is divided and easily absorbed.

The present invention uses no expensive gears for transmitting power and this is important since such gears are expensive and difficult to maintain and also require massive frames that are expensive and heavy.

Furthermore, large propeller type wind power machines do not rotate fast enough to directly turn a generator efficiently since they need gear arrangements to drive the generator at a sufficient speed. With the present invention, power is taken out near the circumference of the lower rotor plate so as to automatically provide a speed gain to drive the generator. The air shield can be rotated manually or automatically in either direction and enables the rotor to pick up most efficiently the energy from the wind and also acts as a primary control over the speed of the rotor. The present invention will stand up against storms and heavy or high wind pressure. The tower is ruggedly constructed and the rotor which surrounds the tower provides a simple strong structure which does not require guys or the like. The shield turns a full 360°. By having the tower of tapering shape, the tower can be made strong enough to withstand the various pressures or weight. The two bearings 39 and 28 are combination radial and thrust bearings and each one can carry both the weight of its own part plus the side thrust as well. Suitable spacers can be provided adjacent to the bearings. Furthermore, the number of blades can be varied as desired and also the cross sectional shape of the blades can be varied, as for example the blades may be straight in cross section or else they may be curved or angled. Furthermore, the surface of the air shield can be relatively smooth, corrugated or reinforced in ribs to give an increasing amount of strength without departing from the spirit of the present invention.

I claim:

1. In a wind power machine, a stationary base including a horizontally disposed top wall and vertically disposed side walls, horizontally disposed flanges on the lower edges of said side walls, a horizontally disposed shaft extending through one of said side walls and having a pulley on its outer end and a friction wheel on its inner end, there being a cutout in the top wall of said base for the projection therethrough of said friction wheel, a stationary tower extending upwardly from said base, a rotor mounted for rotary movement about said tower and said rotor including a lower circular disc arranged in engagement with said friction wheel, said rotor further including an upper circular disc of less diameter than said lower disc, a plurality of radially disposed blades extending between said discs and secured thereto, a movable shield surrounding a portion of said rotor, said shield including a curved baffle and a horizontally disposed top plate, a stub shaft extending from the top of said tower to the top plate on said shield, ball bearing assemblies arranged in engagement with said stub shaft and engaging the top of said rotor and the top plate on said shield, and a horizontally disposed circular plate connected to the lower end of said shield.

2. The structure as defined in claim 1 and further including means for rotating said shield.

3. In a wind power machine, a stationary base including a horizontally disposed top wall and vertically disposed side walls, horizontally disposed flanges on the lower edges of said side walls, a horizontally disposed shaft extending through one of said side walls and having a pulley on its outer end and a friction wheel on its inner end, there being a cutout in the top wall of said base for the projection therethrough of said friction wheel, a stationary tower extending upwardly from said base, a rotor mounted for rotary movement about said tower and said rotor including a lower circular disc arranged in engagement with said friction wheel, said rotor further including an upper circular disc of less diameter than said lower disc, a plurality of radially disposed blades extending between said discs and secured thereto, a movable shield surrounding a portion of said rotor, said shield including a curved baffle and a horizontally disposed top plate, a stub shaft extending from the top of said tower to the top plate on said shield, ball bearing assemblies arranged in engagement with said stub shaft and engaging the top of said rotor and the top blade on said shield and a horizontally disposed circular plate connected to the lower end of said shield, means for rotating said shield, said means comprising a motor mounted in said base and adapted to be connected to a source of electrical energy, shaft means driven by said motor, and a roller arranged in engagement with said plate on the lower end of said shield and connected to said shaft means.

4. The structure as defined in claim 3 wherein said tower has a tapered shape so that the lower portion thereof is larger than the upper portion thereof.

5. The structure as defined in claim 3 and further including guide rollers engaging the lower portion of said shield, and guide rollers engaging the lower portion of said rotor.

References Cited in the file of this patent

UNITED STATES PATENTS

| | | |
|---|---|---|
| 544,654 | Bowen | Aug. 20, 1895 |
| 1,503,061 | Pendergast | July 29, 1924 |
| 1,614,268 | Wilson | Jan. 11, 1927 |

FOREIGN PATENTS

| | | |
|---|---|---|
| 946,640 | France | June 9, 1949 |